3,077,625
FILM CLEANER
Eric S. Lindau, 676 Western Ave., Lake Forest, Ill.
Filed Feb. 19, 1959, Ser. No. 794,389
3 Claims. (Cl. 15—77)

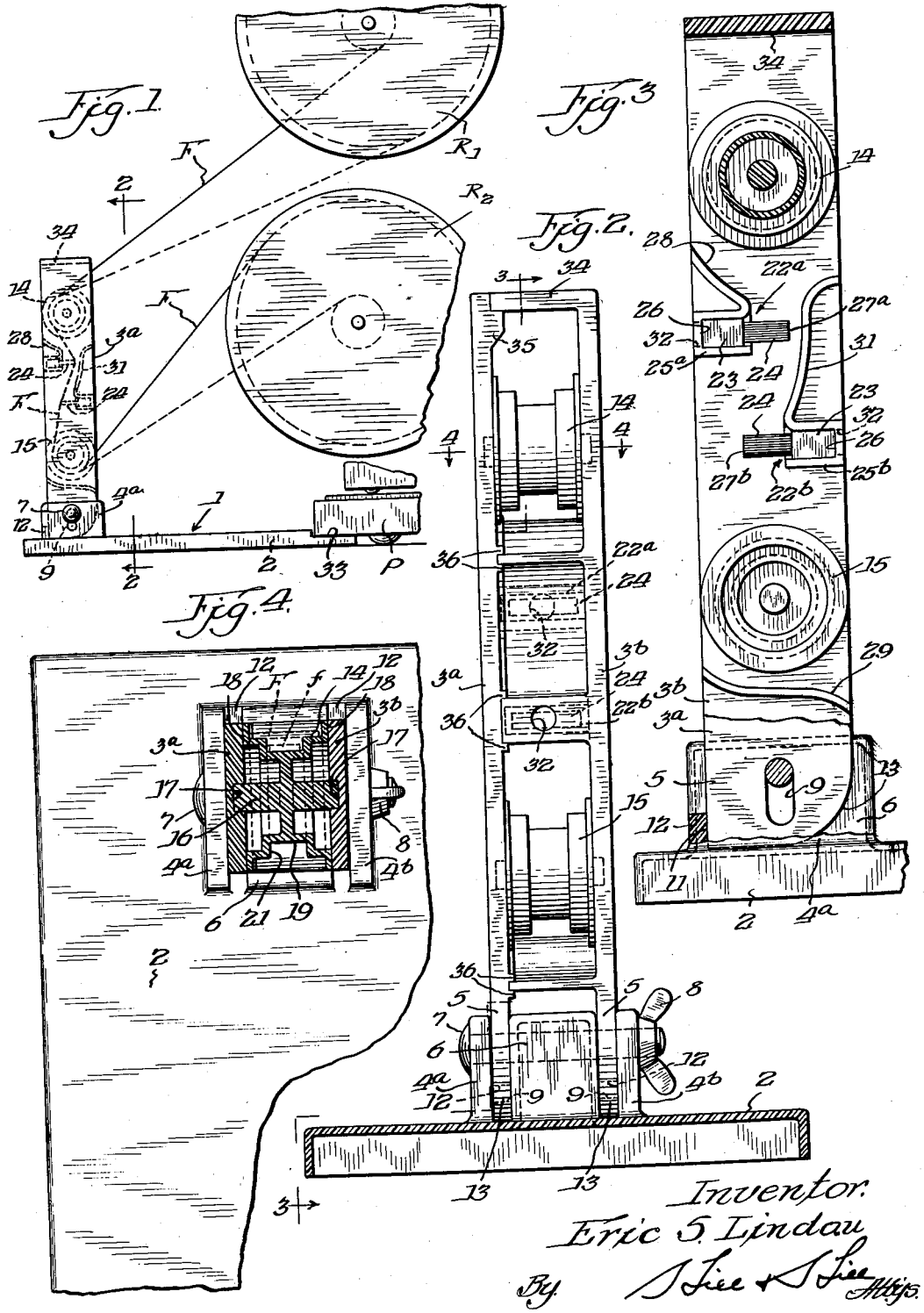

The invention relates generally to apparatus applicable to strip cleaning operations such as the cleaning of movie film, magnetic tape and similar articles.

For the purposes of illustration, the invention will be illustrated and described in connection with a structure particularly suitable for cleaning movie film and other strip material.

The present invention has among its objects the utilization and production of a device utilizing the same which may make use of electro motive or electrostatic forces developed or accumulated in or on the medium with which the invention is employed, resulting in a highly efficient action.

Another object of the invention is the production of such a device, which, in certain instances may utilize a film, web or other medium to receive the particles or constituents to be removed, such medium being constructed to attract the same and thereafter removed from the medium by suitable means.

Film strips readily pick up fine dust, etc. which usually is partially deposited and accumulates on portions of the projector structure such as the film gate, sometimes to the extent that the film is ultimately scratched. A number of various small brushes and the like have been available, such devices being designed to be manually held against a face of film moving across the same and in such case two runs of the film would have to be made, one for each face thereof.

The present invention, in its application to movie films and the like, further has among its objects the production of a film cleaning device which is automatic in operation, cleaning both sides of the film as the latter passes through the device.

Another object of the invention is the production of such a device which is designed to be employed with a film projector, a film editing device or the like which provides the power for advancing the film through the cleaning device, the latter preferably being constructed to engage such projector or the like and be thereby retained in substantially fixed relation with respect thereto.

Another object of the invention is the production of such a device which, if desired, may readily use any one or a combination of a number of different types of cleaning elements.

A further object of the invention is the production of a very efficient film cleaning device which is very simple in construction, inexpensive to manufacture and which may be so constructed that it may be readily collapsed or folded when not in use to occupy a minimum of storage space.

Many other objects and advantages of the construction herein shown and described will be obvious to those skilled in the art from the disclosure herein given.

In the drawings, wherein like of corresponding parts indicate like or corresponding parts:

FIG. 1 is a side elevational view of a device embodying the present invention, illustrating the same in an operative position with respect to a projector;

FIG. 2 is a sectional view taken approximately on the line 2—2 of FIG. 1;

FIG. 3 is a sectional view taken approximately on the line 3—3 of FIG. 2; and

FIG. 4 is a sectional view taken approximately on the line 4—4 of FIG. 2.

The present invention further contemplates, with respect to its specific application to movie film cleaning and the like, the use of a pair of film engageable cleaning elements arranged to clean both faces of a film strip inserted in the device, together with means for guiding the film to and from the cleaning elements.

In the preferred form of the invention for film cleaning and the like, such guiding means includes or comprises a pair of spools over which the film travels.

While soft brushes have proven very efficient for use as cleaning elements, other suitable types of cleaning elements may be employed. For example, such types might embody fabric, fibers, magnetic, electrostatic elements, etc., depending on the particular application.

Referring to the drawings and more particularly to FIG. 1, the embodiment of the invention illustrated comprises a supporting structure indicated generally by the numeral 1, and including a base member 2 and a pair of laterally spaced generally parallel uprights 3a and 3b, illustrated in the present instance as being formed from a suitable material such as plastic, the uprights 3a and 3b being so connected with the base 2 that the former may be collapsed or folded into a generally parallel relationship with respect to the base 2. This may be accomplished by providing the base 2 with a pair of standards 4a and 4b which are spaced apart a sufficient distance to receive the adjoining end portions 5, of the uprights 3a and 3b, therebetween, with a centrally disposed projection or block 6 formed on the base 2 positioned between the adjacent portions 5 of the uprights.

The uprights may be secured to the base 2 by a bolt 7 passing through the standards 4a and 4b, the intermediate portion 6, and the portions 5 of the uprights, with the free end of the bolt 7 being provided with suitable means such as a wing nut 8 cooperable therewith to clamp the uprights in a vertical position as illustrated in FIGS. 1 and 2. As illustrated in FIG. 3, the end portions 5 of the uprights may be provided with elongated slots 9 through which the bolt 7 extends, and engageable with the edges of the portions 5 of the uprights is a transversely extending abutment 12 operative to normally limit pivotal movement of the uprights in a clockwise direction as viewed in FIG. 3. However, by moving the uprights vertically upward to position the bolt 7 at the bottom of the slot 9, the lower edges of the portions 5 of the uprights may be raised above the plane of the top of the abutment 12, following which the uprights may be rotated in a clockwise direction, as viewed in FIG. 3, to a position in which they extend more or less parallel to the base 2, the opposite edges of the portions 5 being rounded as indicated at 13 to permit such action. The parts may be retained in collapsed or folded position by again tightening the thumb nut 8.

Suitably supported for rotatable movement between the uprights 3a and 3b is an upper spool or roller 14 and a lower spool or roller 15. As illustrated in FIG. 4, the spools 14 and 15 may be provided with integrally formed shafts or axles 16, illustrated as being journaled in bores 17 in the uprights, whereby the spools are freely rotatable on their axes, the construction illustrated being very easily and simply manufactured by molding processes or the like and the entire structure readily adapts itself for the use of plastics in its fabrication. However, obviously, if desired, one or both of the uprights 3a or 3b could be provided with suitable supporting means such as a stationary shaft or the like which would extend through suitable hubs or bearings on the spools and thus rotatably support the latter thereon.

As illustrated in FIG. 4, each spool may be provided with radially directed flanges or side walls 18 adapted to confine a film such as a standard 16 mm. film F (indicated in dotted lines in FIG. 4), on the spool, and if desired, the peripheral surface of the hub portion 19 of the spools may be provided with an annular shaped channel 21 of a size to receive a smaller film F such as a standard 8 mm. film, also indicated in FIG. 4 in dotted lines, so that either size film may be accurately and efficiently supported on the spools.

Positioned between the upper and lower spools 14 and 15 are a pair of particle receiving elements indicated generally by the numerals 22a and 22b illustrated as comprising a pair of brushes, each having a base portion 23 and a plurality of very fine hair bristles 24, the latter being of a type similar to that presently on the market in the form of small hand film-cleaning brushes. Referring to FIGS. 2 and 3, it will be noted that the particular brushes illustrated are generally of rectangular shape and cross section and may be supported in holders 25a and 25b which are shown as being formed integrally with the upright 3b and having a recess or channel 26 therein of a size and shape to receive the base 23 of each brush. The brushes may be held in position by any suitable means, as for example, a light press fit between the bases 23 and the associated holders.

As particularly illustrated in FIG. 3, the brushes are so disposed with respect to the spools 14 and 15 that the end faces 27a and 27b of the brushes are laterally offset, so that a film passing over the spools could be threaded across the end edges of each brush in the manner illustrated in dotted lines in FIG. 1, and in such case it will be apparent that the brush 22a will engage and clean one face of the film strip, while the brush 22b will clean the opposite face thereof.

If desired, additional film guiding means may be disposed between the uprights 3a and 3b, as for example, upper and lower guide members 28 and 29 and an intermediate guide member 31, the guide members 28 and 31 being illustrated as formed integrally with the holders 25a and 25b, respectively. In most cases, however, the device will function satisfactorily without any additional guides such as those referred to, the film merely passing over the spools and the adjacent cooperable portions of the brushes as illustrated and described.

The brushes 22a and 22b are preferably removably supported in the holders 25a and 25b, and to facilitate removal of the brushes, the end walls of the holders may be provided with suitable openings 32 through which pressure may be exerted on the brushes to facilitate their removal. In the case of the upper brush 22a, the bristles 27a may be readily deflected over the guide 31 to permit removal of the brush.

The device may be readily used with any suitable means for supporting and advancing the film through the device, as for example, a projector, film editing equipment, etc., and in FIG. 1 a portion of a projector P is illustrated which is suitably constructed to support an upper reel R1 and a lower reel R2, the film F being illustrated as extending from the upper reel R1 over and around the upper spool 14 by the brush 22a, brush 22b and lower spool 15 back to the lower reel R2. The film may then be rewound from one spool to the other, both sides of the film being cleaned as it passes through the device. As illustrated in FIG. 1, the device may be maintained in a relatively fixed position with respect to the projector by means of the latter, which may be placed on top of the base 2, the construction illustrated utilizing a base having an offset end portion 33 adapted to receive the base portion of the projector P.

The device could be used in a similar manner with film editing equipment, etc., or in certain applications suitable supporting and advancing means for the film or other media could be incorporated directly with the device.

Likewise, in some cases, it might be desirable to employ the film cleaner on a projector or other equipment by varying the construction of the device to enable its mounting directly on a projector or other piece of equipment and employed as an integrated part thereof.

While I have illustrated the cleaning elements 22a and 22b as comprising brush members, it is believed apparent that other types of cleaning elements could be employed, as for example, fabric or fiber cleaners, electrostatic elements, etc. Furthermore, if desired, a combination of such type of cleaning elements could be employed in a single structure and the holders therefor accordingly designed, or if desired, additional holders could be utilized for auxiliary cleaning elements.

I have found that in operation the film movement, particularly in connection with the separation of one turn or film from another, as the film unwinds from one spool, creates or produces a relatively very strong electrical potential which tends to attract or accumulate particles on the film strip. In the case of movie film, the accumulations thereon are probably due, in a large part, to such action which is particularly made use of in the present invention.

Thus, the device, in the case of a move film cleaner, when used in conjunction with a projector as illustrated in FIG. 1, is so arranged with respect to the film discharging reel R1 that the film moves directly therefrom to the device so that developed energy in or on the film is not dissipated before reaching the accumulator or collector brushes. It is this action that retains the accumulations on the brushes as distinguished from a mere brushing or sweeping action which would merely sweep or knock the particles or accumulations from the film into the atmosphere. Instead, the collectors will receive and retain all accumulations on the film. In such operation, all or a part of the electrical charge associated with the film may be discharged through the brush.

As previously mentioned, the film cleaning device may be suitably fabricated, the particular embodiment illustrated readily adapting itself to plastic molding processes and the like. For example, the brush holders 25a and 25b, the guides 28, 29 and 31, as well as the upper cross member 34, may all be fabricated as a part of one upright, such as the upright 3b, and if desired, cooperable flanges or projectors 35 and 36 may be provided on the other upright for engagement with the associated parts, the latter preferably being cemented or bonded into an integral structure. The flanges or projectors 35 and 36 would either follow the contours of the particular member with which it is to be associated or merely bear thereon at spaced points.

It will also be noted that the resulting structure is extremely simple, inexpensive and highly efficient for the purposes intended.

Likewise, it will be apparent that I have provided a very simple yet highly efficient film cleaner which may be readily set up for use with a projector or film editing equipment and the like, and when not in use may be readily folded or collapsed for easy storage.

Having thus described my invention, it is obvious that various immaterial modifications may be made in the same without departing from the spirit of my invention as set forth in the claims; hence I do not wish to be understood as limiting myself to the form, construction, arrangement and combination of parts herein shown and described or uses mentioned.

What I claim as new and desire to secure by Letters Patent is:

1. In a film device, the combination of a supporting structure constructed to receive a continuously moving film from a film discharge reel, a pair of detachable cleaning elements each having a yieldable film-engageable cleaning portion constructed to at least partially dissipate static charges on the moving film engageable therewith, resulting at least in part from the separation of continuous layers of film on such a film discharge reel as film is withdrawn therefrom, whereby attraction between such dust and dirt particles and such film is reduced and such dust and dirt may be removed therefrom and held, at least in part, on said cleaning portion as a result of the transfer of such charge from such film to such cleaning element, each of the latter having a rigid supporting portion which carries said film engageable cleaning portion, said supporting structure having socket means for the base portion of each cleaning element in which the respective base portion thereof may be detachably supported in relatively rigid relation with respect to said base structure, the film engageable portions of said elements extending in generally opposite directions, said supporting structure being constructed to provide space between said sockets through which a film may move, the yieldable portion of one cleaning element disposed in yieldable engagement with one face of such a film and the cleaning portion of the other cleaning element disposed in yieldable engagement with the other face of such a film.

2. A film cleaning device as defined in claim 1, wherein the yieldable portions of said cleaning elements each comprise a very fine soft brush, the individual hairs of which are of a material capable of picking up a static charge from a film moving in contact therewith.

3. A film cleaning device as defined in claim 1, having means for guiding the film between said cleaning elements and comprising a pair of rotatable guide spools of a width to accommodate sixteen millimeter film and having an annular channel in the peripheral surface thereof of a size to receive and guide eight millimeter film.

References Cited in the file of this patent

UNITED STATES PATENTS

| | | |
|---|---|---|
| 977,466 | Mortimer | Dec. 6, 1910 |
| 1,189,633 | Shue | July 4, 1916 |
| 1,239,295 | Noble | Sept. 4, 1917 |
| 1,766,512 | Hausmann | June 24, 1930 |
| 1,933,084 | Allison | Oct. 31, 1933 |
| 1,926,981 | Gould | Sept. 12, 1933 |
| 2,338,843 | Glaser | Jan. 11, 1944 |
| 2,443,662 | Pegg | June 22, 1948 |
| 2,535,697 | Ross | Dec. 26, 1950 |
| 2,623,225 | Frankel | Dec. 30, 1952 |
| 2,920,987 | Landry | Jan. 12, 1960 |